(12) United States Patent
Huang et al.

(10) Patent No.: US 6,615,290 B1
(45) Date of Patent: Sep. 2, 2003

(54) END-OF-SCAN REPORTING SYSTEM

(75) Inventors: Yin-Chun Huang, Hsinchu (TW); Shih-Zheng Kuo, Taipei Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/478,861

(22) Filed: Jan. 7, 2000

(51) Int. Cl.⁷ .................................................. G06F 3/00
(52) U.S. Cl. ........................ 710/18; 710/5; 710/31; 712/225
(58) Field of Search ............................. 710/1, 5, 15, 18, 710/19, 64, 72, 6, 17, 31, 36; 709/102, 242; 712/225

(56) References Cited

U.S. PATENT DOCUMENTS

| | | | | |
|---|---|---|---|---|
| 5,229,866 A | * | 7/1993 | Kashiwagi et al. | 358/444 |
| 5,463,476 A | * | 10/1995 | Oya | 358/426 |
| 5,511,220 A | * | 4/1996 | Perlman | 395/800 |
| 5,532,841 A | * | 7/1996 | Nakajima et al. | 358/408 |
| 6,104,922 A | * | 8/2000 | Baumann | 455/410 |
| 6,108,462 A | * | 8/2000 | Aoki et al. | 382/313 |
| 6,115,739 A | * | 9/2000 | Ogawa et al. | 709/215 |
| 6,289,371 B1 | * | 9/2001 | Kumpf et al. | 709/203 |
| 6,354,499 B2 | * | 3/2002 | Matsueda et al. | 235/435 |

* cited by examiner

Primary Examiner—Kim Huynh
Assistant Examiner—RiJue Mai
(74) Attorney, Agent, or Firm—J.C. Patents

(57) ABSTRACT

A reporting system capable of reporting the end of a scanning session to a user through existing computer peripheral devices is proposed. By reporting at the end of a scanning session, the user can proceed with subsequent scanning operations with no delay. Hence, idle time of the scanner is greatly reduced.

14 Claims, 1 Drawing Sheet

END-OF-SCAN REPORTING SYSTEM

BACKGROUND OF THE INVENTION

1. Field of the Invention

The present invention relates to an end-of-scan reporting system. More particularly, the present invention relates to a system that reports the completion of a scanning session to a user through computer peripheral components.

2. Description of the Related Art

Due to progress in multi-media technologies, advanced image processing techniques have lead to the development of many peripheral image processors. A scanner is one of the imaging processors that have recently become an indispensable piece of equipment. Developed from earlier versions of the black-and-white palm top scanner, full color high-resolution scanners capable of producing fine real images are widespread nowadays.

Currently, most scanners in the market have a user interface capable of reporting to the user as soon as a scanning session is complete so that the user can plan the next task. In general, when a picture or document is being scanned, a user must watch for the end of the scanning session. As soon as a scanning session is complete, a scan completion icon appears on a computer screen through the user interface. Next, the user has to replace the page with a new one and then watch the computer screen again to find out when the scanning session ends. This type of operation is likely to prevent the user from performing other tasks. Alternatively, if the user spends time doing other asks, the user may miss the end of session notice displayed on the computer screen and leave the scanner in an idle state. Hence, the current method of operating the scanner is quite inconvenient.

Some higher-grade scanners now include an automatic document feeder (ADF) so that the user can put a number of pages into a tray and extend each scanning session. At the end of the multi-paper scanning session, an end-of-scanning icon is similarly displayed on the computer screen through the user interface so that the user is notified. However, if the user is occupied with some other tasks at that time, the end-of-scan notice may be missed. Hence, the scanner will still be left in an idle state for quite some time.

SUMMARY OF THE INVENTION

The invention provides a method of reporting the end of a scanning session to a user. The method includes determining the types of peripheral devices needed to report to the user at the end of a scanning session. When the current scanning task is complete, the selected peripheral devices automatically informs the user of the end of the scanning session.

This invention also provides a method of reporting the end of a scanning session to a user. The method includes using a computer to detect all the available peripheral devices for reporting the end of a scanning session. The most suitable peripheral device or devices for reporting end of scanning session to the user are then chosen. After the current scanning session is complete, the end of session notice is signaled to the user via the selected peripheral devices. Next, the computer decides if there is any further scanning task to perform. If there is any other scanning task to perform, the most suitable peripheral device or devices for reporting the end of a scanning session to the user is again chosen. If no more tasks are pending, the reporting system halts.

Accordingly, the present invention is to provide a reporting system capable of notifying a user of the end of a scanning session through computer peripheral devices. In addition, the invention is to provide a method of reporting the end of a scanning session to a user in real time so that subsequent scanning operations can proceed immediately with no delays. Hence, idle time of the scanner is greatly reduced.

It is to be understood that both the foregoing general description and the following detailed description are exemplary, and are intended to provide further explanation of the invention as claimed.

BRIEF DESCRIPTION OF THE DRAWING

The accompanying drawing is included to provide a further understanding of the invention, and is incorporated in and constitutes a part of this specification. The drawing illustrates embodiments of the invention and, together with the description, serves to explain the principles of the invention. In the drawing.

DESCRIPTION OF THE PREFERRED EMBODIMENTS

Figure 1:
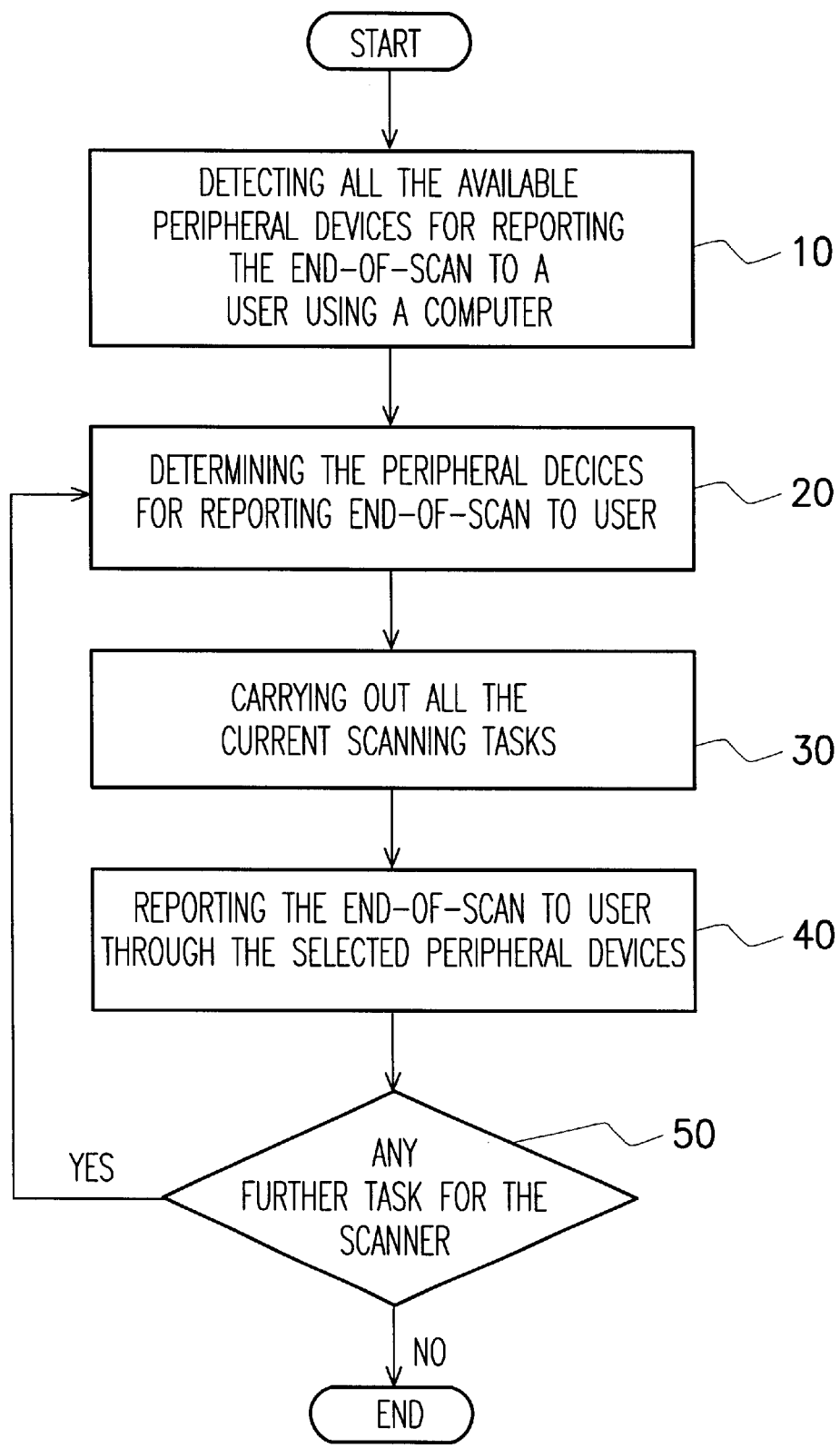
FIG. 1 is a flow chart showing the steps carried out in an end-of-scanning reporting system according to this invention.

Reference will now be made in detail to the present preferred embodiments of the invention, examples of which are illustrated in the accompanying drawing. Wherever possible, the same reference numbers are used in the drawings and the description to refer to the same or like parts.

The end-of-scan reporting system in this invention is achieved by appending application programs to the user interface program of a scanner. When the user interface picks up an end-of-scan signal from the scanner, an end-of-scan icon will be displayed on the computer screen as before. However, the system is also capable of reporting the end of scanning session to a user through a user-defined peripheral device or devices so that the user can continue or terminate the scanning task immediately. Hence, machine idle time is reduced.

The peripheral devices for reporting the end of a scanning session to a user can be a sound card capable of emitting a sound, the loudspeaker inside a computer system, a network card inside a computer system capable of sending electronic mail to a user's mailbox, or a data recorder capable of dialing a user's telephone number, pager number or mobile telephone number.

FIG. 1 is a flow chart showing the steps carried out in an end-of-scanning reporting system according to this invention. In step 10, before a user begins some scanning task, the computer makes a quick search for all the peripheral devices available for reporting end-of-scan to the user. The purpose of making such a search is to ensure that the desired reporting device or devices are present. In step 20, a suitable peripheral device or devices for reporting the end of scanning session are selected. In general, the most convenient method of reporting is chosen. For example, sound may be broadcast from a sound card or from the on-board computer loudspeaker. Alternatively, the end of scanning notice may be e-mailed to a pre-specified user mailbox. In some cases, a digital data recorder may be used to dial a telephone number, a mobile telephone number or a pager number to notify the user. The scanning task is conducted in step 30. The scanning task includes scanning a single page or a number of pages using an automatic paper feeder. After the scanning operation, the pre-selected peripheral device or devices are activated to report the end of a scanning session in step 40. After reporting the end of a scanning session, the system must make a conditioned return. In step 50, the system detects whether there is a scanning task waiting. If there is a scanning task pending, the system jumps back to step 20 where the available peripheral devices are again detected. Otherwise, if no scanning task is waiting, the system terminates.

In summary, one major advantage of this invention is the utilization of existing peripheral devices to report the end of a scanning session to a user. Through the notification made by the peripheral devices, the user is able to activate the next scanning task quickly so that idle time of the scanner is greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of reporting an end of a scanning session to a user, comprising the steps of:

selecting a peripheral device capable of reporting the end of a scanning session to the user; and notifying the user through the selected peripheral device after a series of scanning tasks has ended.

2. The method of claim 1, wherein the peripheral device includes a sound card capable of emitting sound.

3. The method of claim 1, wherein the peripheral device includes a loudspeaker installed inside a computer.

4. The method of claim 1, wherein the peripheral device includes a network card capable of transmitting electronic mail to a mailbox of the user.

5. The method of claim 1, wherein the peripheral device includes a digital data recorder capable of dialing a telephone number.

6. The method of claim 1, wherein the peripheral device includes a digital data recorder capable of dialing a pager number.

7. The method of claim 1, wherein the peripheral device includes a digital data recorder capable of dialing a mobile telephone number.

8. A method of reporting an end of a scanning session to a user, comprising the steps of:

using a computer to detect how many peripheral devices are available for reporting the end of a scanning session to the user;

selecting at least a peripheral device to report the end of a scanning session to the user;

performing all scanning tasks in a scanning session;

notifying the user, through the selected peripheral device, that a series of scanning tasks has ended; and determining if a scanning operation is waiting, wherein if a scanning operation is waiting, the method jumps to the step of selecting the peripheral device, and if no scanning operation is waiting, the scanning operation is terminated.

9. The method of claim 8, wherein the peripheral device includes a sound card capable of emitting sound.

10. The method of claim 8, wherein the peripheral device includes a loudspeaker installed inside a computer.

11. The method of claim 8, wherein the peripheral device includes a network card capable of transmitting electronic mail to a mailbox of a user.

12. The method of claim 8, wherein the peripheral device includes a digital data recorder capable of dialing a telephone number.

13. The method of claim 8, wherein the peripheral device includes a digital data recorder capable of dialing a pager number.

14. The method of claim 8, wherein the peripheral device includes a digital data recorder capable of dialing a mobile telephone number.

* * * * *